United States Patent [19]
Rondier

[11] Patent Number: 5,486,732
[45] Date of Patent: Jan. 23, 1996

[54] SLIP RING UNIT FOR FITTING TO AN ALTERNATOR, ESPECIALLY FOR A MOTOR VEHICLE

[75] Inventor: Patrick Rondier, Montmagny, France

[73] Assignee: Valeo Equipements Electriques Moteur, Creteil, France

[21] Appl. No.: 304,361

[22] Filed: Sep. 21, 1994

[30] Foreign Application Priority Data

Sep. 16, 1993 [FR] France ................................. 93 11041

[51] Int. Cl.⁶ .............................................. H02K 13/02
[52] U.S. Cl. ............................ 310/232; 310/71; 310/234
[58] Field of Search ..................................... 310/232, 219, 310/42, 236, 43, 235, 71, 234, 233; 29/597

[56] References Cited

U.S. PATENT DOCUMENTS

| | | |
|---|---|---|
| 2,157,007 | 5/1939 | Offner . |
| 4,535,264 | 8/1985 | Allport .................................... 310/232 |
| 4,876,474 | 10/1989 | Wang et al. ............................. 310/71 |
| 5,373,209 | 12/1994 | Strobl et al. ............................ 310/234 |

FOREIGN PATENT DOCUMENTS

| | | |
|---|---|---|
| 0094163 | 11/1983 | European Pat. Off. . |
| 1416444 | 12/1975 | United Kingdom . |
| 2091497 | 12/1980 | United Kingdom . |

*Primary Examiner*—R. Skudy
*Attorney, Agent, or Firm*—Morgan & Finnegan

[57] ABSTRACT

A connecting element for a wire end, especially where the wire is a motor vehicle alternator winding, the connector then connecting the wire to slip rings, is formed with a channel for receiving the wire end, this channel being defined between two lugs in facing relationship with each other and joined together through a connecting portion which constitutes the base of the channel. The lugs are bent towards each other so as to grip the wire end. At least one of the lugs has a slot arranged at the level of at least one lateral edge and close to the connecting portion. A portion of the wire end which is bent through about 180° is received in the slot, this bent portion of the wire joining a first portion of the wire end, which extends into the channel, to a second portion of the wire end which extends outside the channel. A separate slip ring unit having such connecting elements, for fitting on an alternator shaft, is also disclosed.

9 Claims, 4 Drawing Sheets

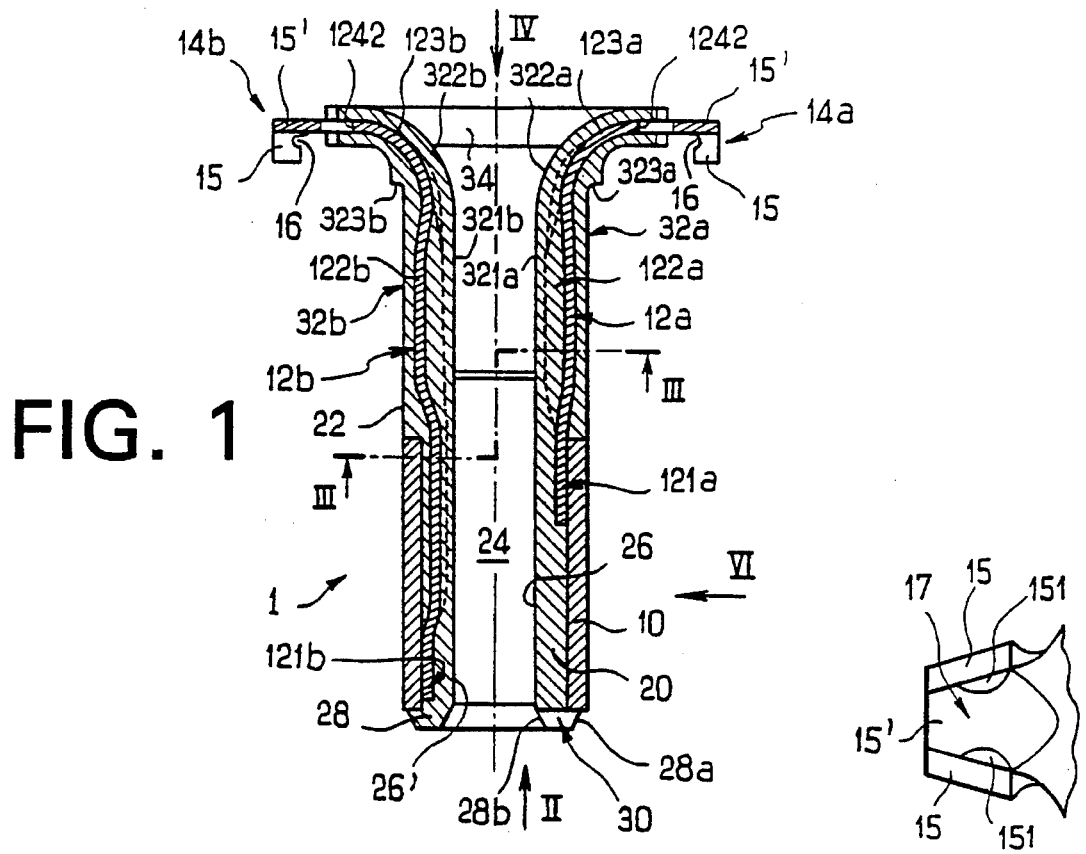
FIG. 1
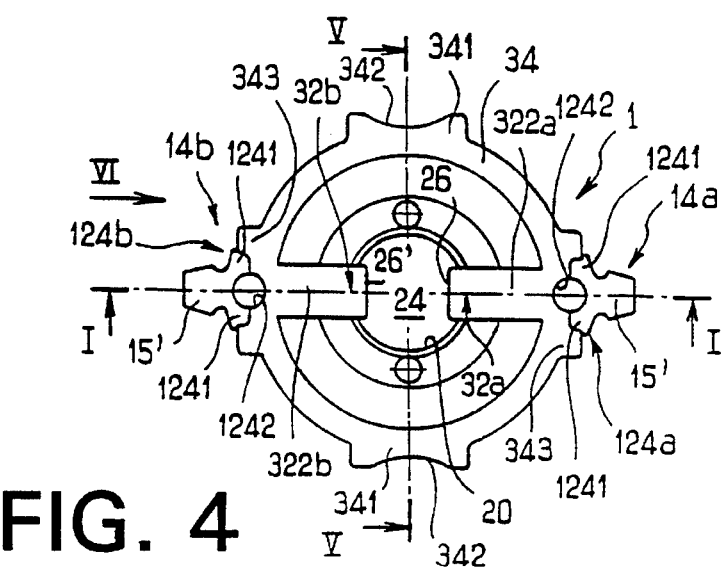
FIG. 2a
FIG. 4

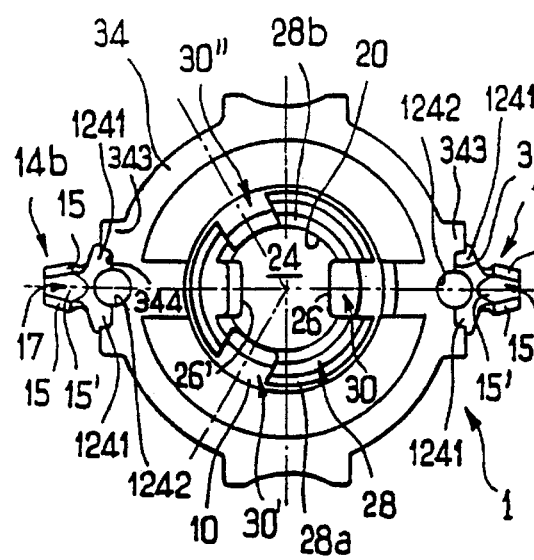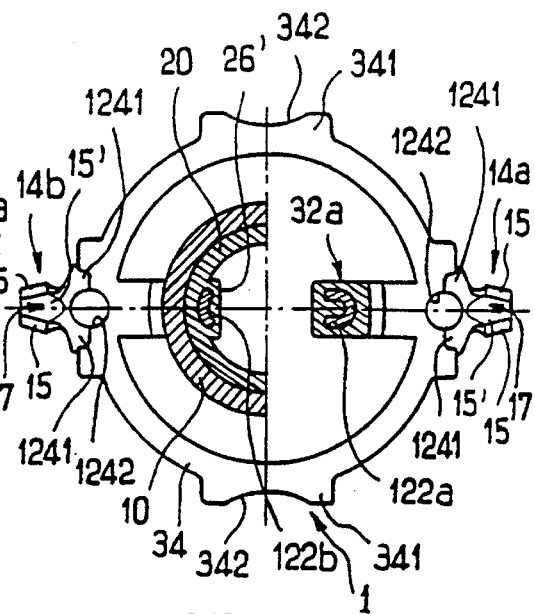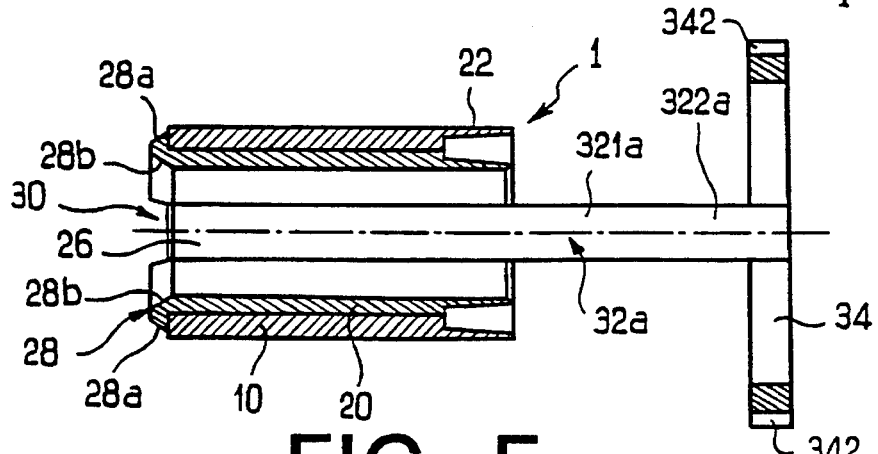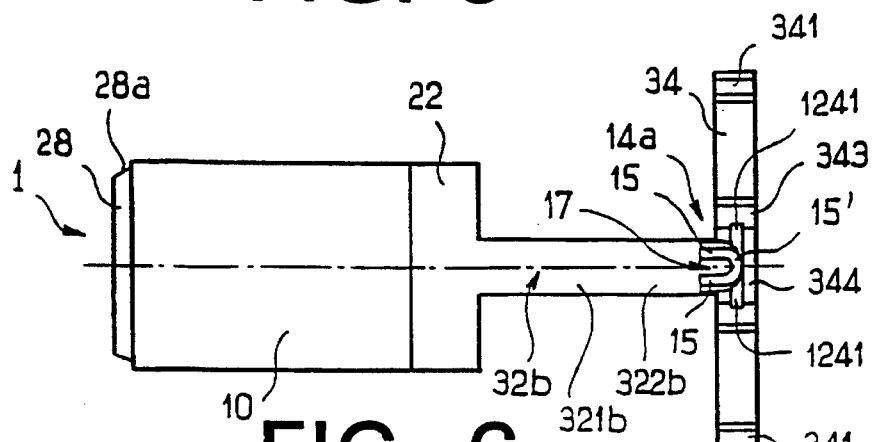

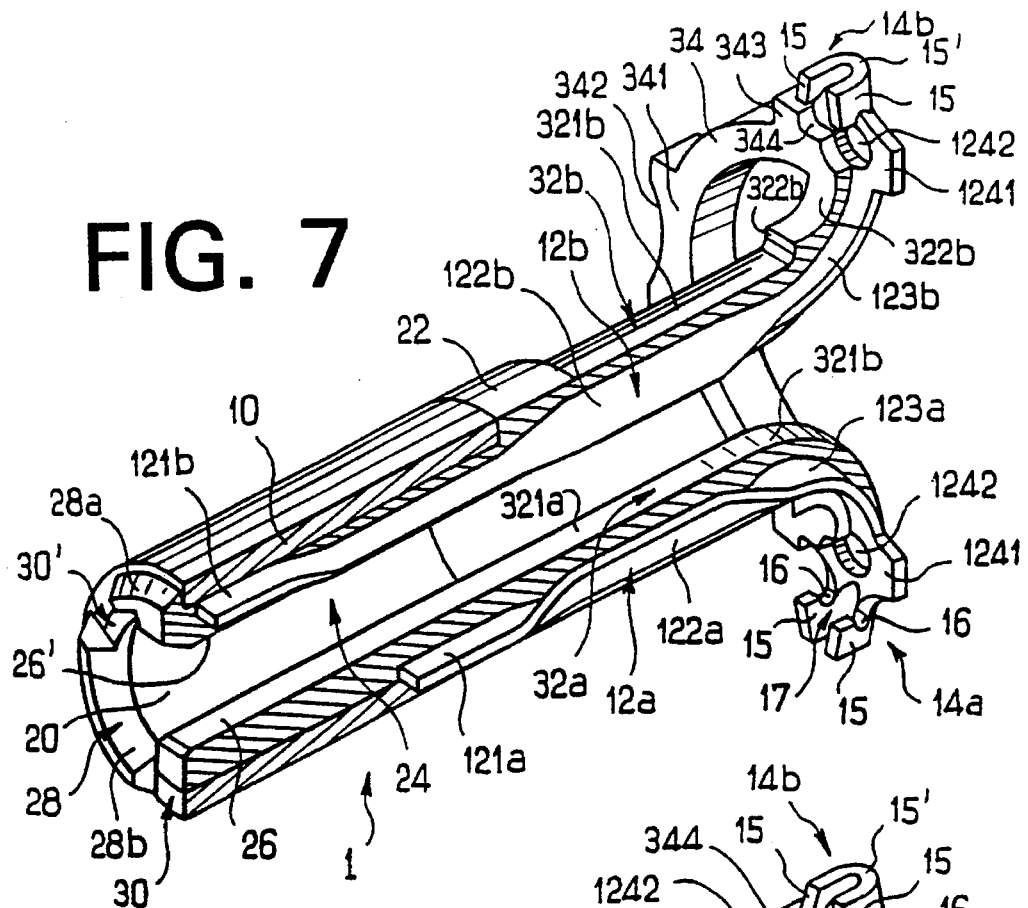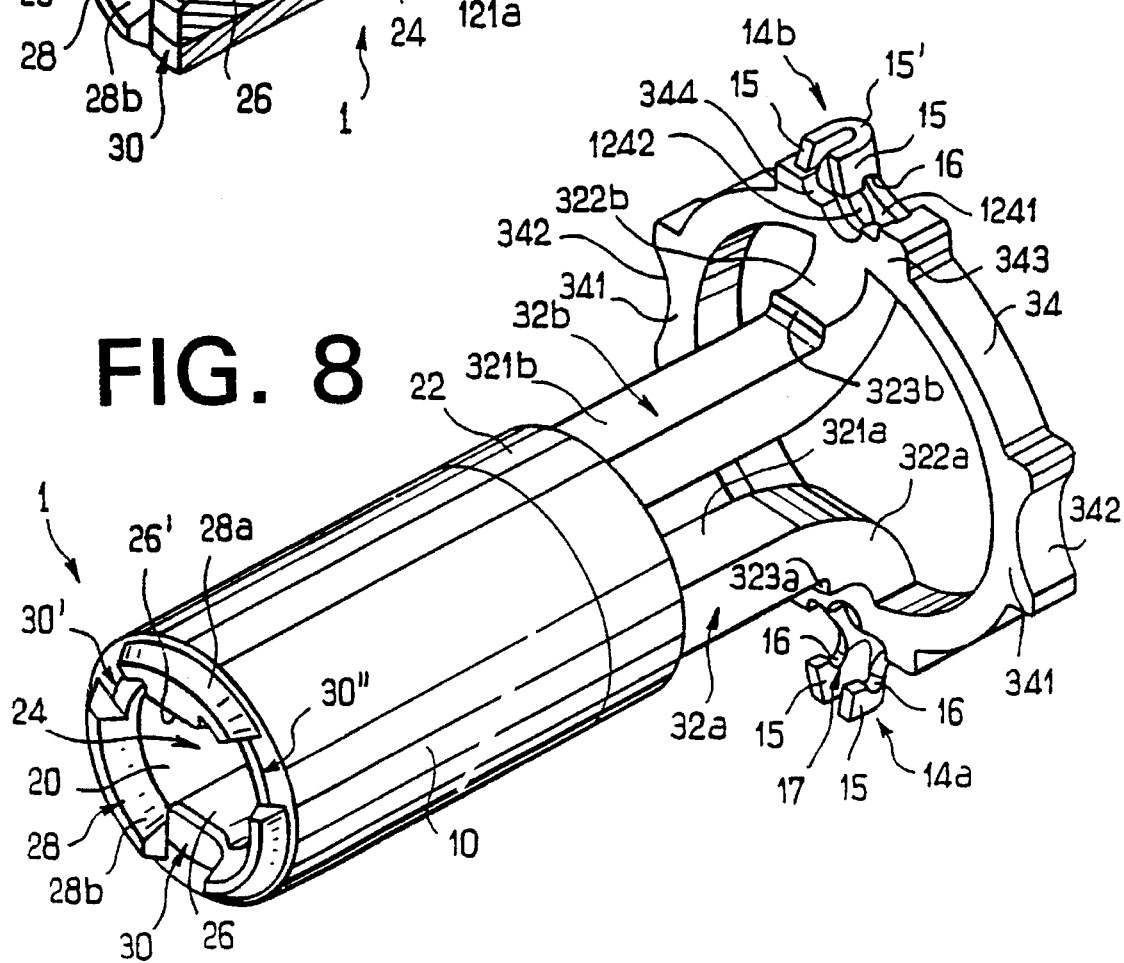

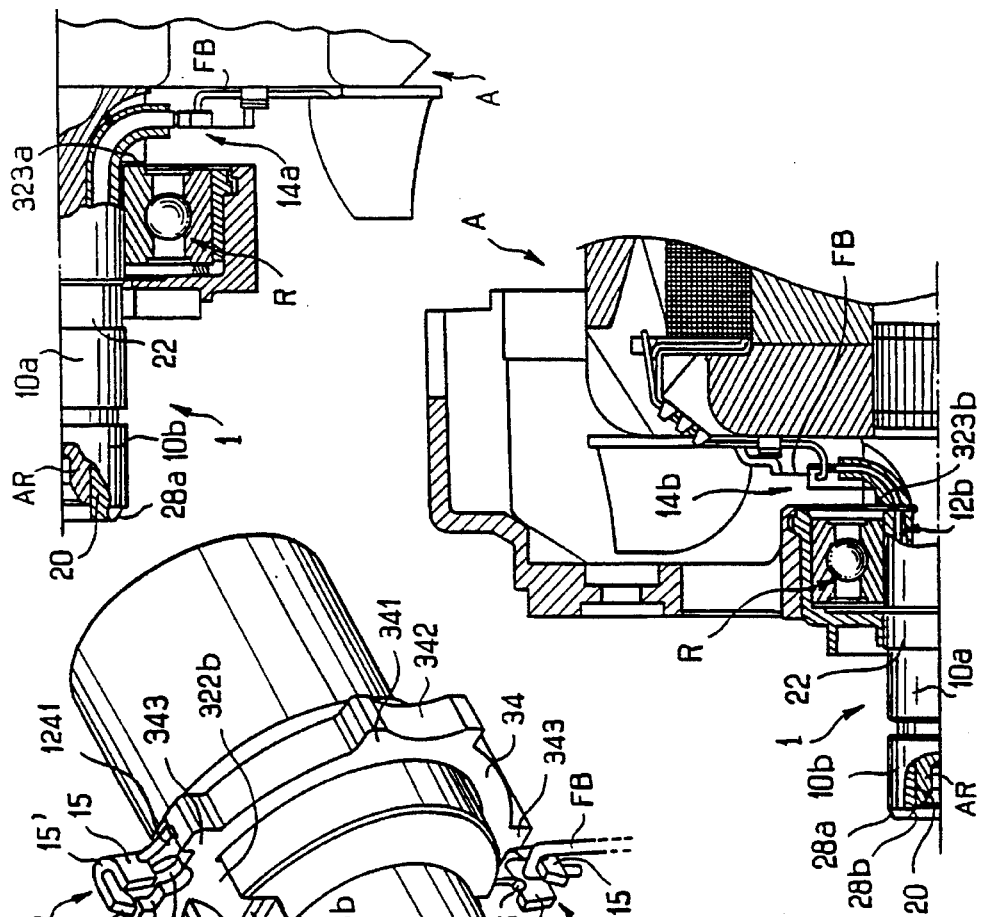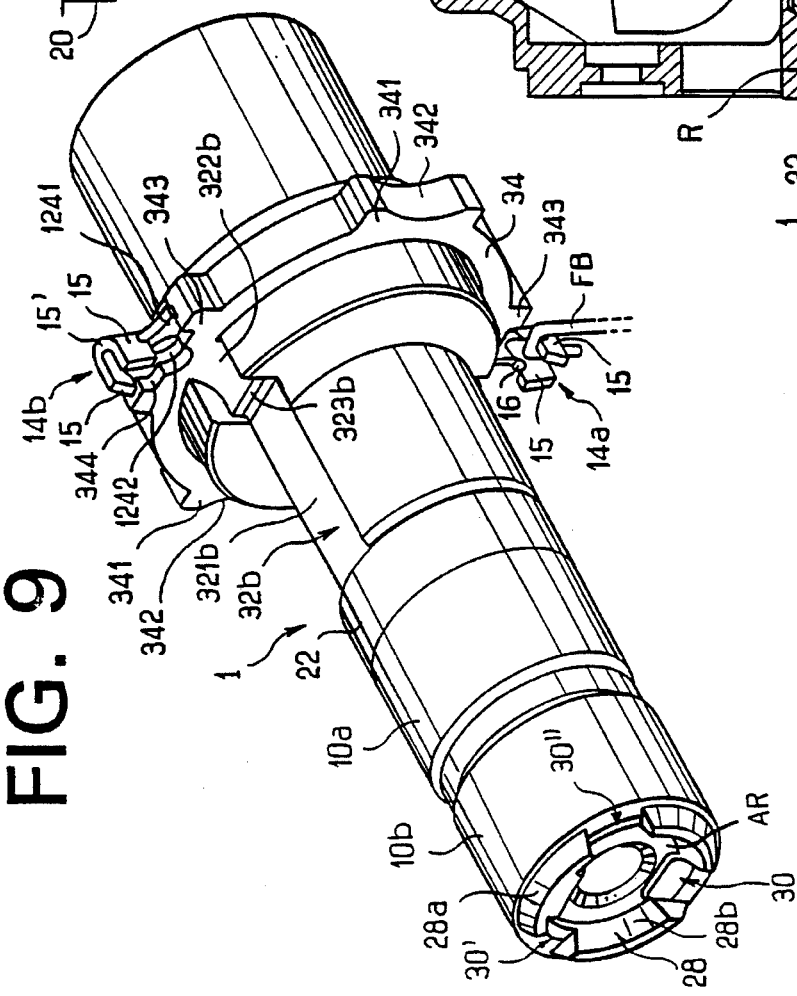

SLIP RING UNIT FOR FITTING TO AN ALTERNATOR, ESPECIALLY FOR A MOTOR VEHICLE

FIELD OF THE INVENTION

The present invention relates in general terms to the connection of ends of wires onto electrical connecting elements, for example in the context of connecting an excitation winding to slip rings in a motor vehicle alternator. More particularly, the invention relates to terminal connections in which a wire has an end portion secured to a terminal comprising a connecting element to which it is secured, for example by soldering and more particularly by electric soldering.

BACKGROUND OF THE INVENTION

Conventionally, a connecting element for an end portion of a wire (wire end) may comprise two lugs or tongues in facing relationship to each other, with the wire end being positioned between them with a view to the wire end being gripped between the two tongues when the latter are deformed towards each other. Such a connecting element may also be formed with one or more holes in which the wire end is engaged and in which it is soldered.

Such connecting elements in the prior art do however suffer from a certain number of drawbacks. In this regard, in the case of a wire gripping terminal, it is found difficult to ensure that the wire is reliably held between the two tongues for the purposes of soldering. In the case of elements for connecting to one or more holes through which the wire is inserted, positioning of the wire end is a somewhat tiresome operation, especially where access to the connecting element is difficult.

More generally, it is found to be extremely difficult, when using known types of connecting elements, to position a wire end reliably using robotic equipment.

DISCUSSION OF THE INVENTION

An object of the present invention is to overcome the above mentioned drawbacks.

According to the invention in a first aspect, a connecting element for an end of a wire, of the type comprising a channel for the wire end, defined between two lugs lying in face to face relationship and connected to each other through a connecting portion constituting the base of the channel, the lugs being adapted to be bent back towards each other for the purpose of gripping the wire end, comprises at least one of the lugs has, at the level of at least one lateral edge and close to the connecting portion, a slot for receiving a portion of the wire end bent through about 180° and situated between a first portion of the wire end extending within the channel and a second portion of the wire end extending outside the channel.

According to a preferred feature of the invention, each of the two lugs has a slot.

According to another preferred feature of the invention, each slot is semicircular in shape.

According to a further preferred feature of the invention, the element terminates one end of a rigid conductor, and each said slot is directed towards the rigid conductor.

According to yet another preferred feature of the invention, the first portion of the wire end terminates the latter, and the channel is divergent from a lateral edge of the lugs not having a slot, towards an opposite lateral edge of the lugs, which does include the slot.

According to yet a further preferred feature of the invention, the connecting element has a U-shaped profile in cross section transverse to the channel.

According to another preferred feature of the invention, each lug has a boss on one of its faces which is directed towards the interior of the channel.

According to the invention in a second aspect, a collector or slip ring unit for attachment on an alternator, especially a motor vehicle alternator, being of the type which is made by moulding insulating material onto electrically conductive elements of the collector, and comprising a generally cylindrical first portion having two slip rings on its outer surface, a second portion comprising two connecting elements for connection with the ends of wires of a winding, and an intermediate portion for effecting electrical and mechanical connection between the first and second portions, and comprising two arms, each of which has a conductive portion for linking a slip ring and a connecting element submerged in the insulating material, comprises two connecting elements according to the invention in its said first aspect.

The invention also embraces an alternator, especially for a motor vehicle, comprises a slip ring unit according to the second aspect of the invention fitted on a projecting shaft of the alternator.

Further aspects, objects and advantages of the present invention will appear more clearly on a reading of the detailed description of a preferred embodiment of the invention which follows, and which is given by way of non-limiting example only and with reference to the accompanying drawings.

BRIEF DESCRIPTION OF THE DRAWINGS

FIG. 1 is a view in axial cross section taken on the line I—I in FIG. 4, showing a member which is adapted to constitute a collector or slip ring unit for an alternator in accordance with the invention.

FIG. 2 is an end view seen in the direction of the arrow II in FIG. 1.

FIG. 2a is a view on a larger scale, showing part of FIG. 2.

FIG. 3 is a view in transverse cross section taken on the line III—III in FIG. 1.

FIG. 4 is an end view in the direction of the arrow IV in FIG. 1.

FIG. 5 is a view in axial cross section taken on the line V—V in FIG. 4.

FIG. 6 is a view in elevation in the direction of the arrow VI in FIG. 4.

FIG. 7 is a perspective view, partly cut away, of the slip ring unit seen in FIGS. 1 to 6.

FIG. 8 is a perspective outside view of the slip ring unit shown in FIGS. 1 to 7.

FIG. 9 is a perspective view of the slip ring unit shown in FIGS. 1 to 8, when connected and mounted on an alternator.

FIG. 10 is a view in vertical axial cross section of part of a first type of alternator equipped with the slip ring unit shown in FIGS. 1 to 8.

FIG. 11 is a view in vertical axial cross section showing part of a second type of alternator equipped with the slip ring unit shown in FIGS. 1 to 8.

DESCRIPTION OF A PREFERRED EMBODIMENT OF THE INVENTION

Reference will first be made to FIGS. 1 to 8, in which a component which constitutes a collector or slip ring unit for an alternator is shown in an intermediate step in its manufacture.

The slip ring unit is generally indicated at 1, and is made by moulding a suitable plastics material, preferably of a thermosetting type, onto electrically conductive elements, which are made of copper, for example. These latter consist, firstly, of two cylindrical slip rings for contact with brushes in the usual way, secondly, two electrical connecting elements for connection with two ends of a rotor winding of the alternator, and thirdly, two electrical linking elements for connection between the two slip rings and the two connecting elements.

In the conventional way, the cylindrical slip rings are initially in the form of a single hollow copper cylinder 10 which, at the end of the manufacturing process of the slip ring unit, is divided circularly over its whole thickness in its middle region so as to form two slip rings 10a and 10b, which are electrically insulated from each other as is best seen in FIG. 9.

The above mentioned connecting elements are indicated respectively at 14a and 14b in various Figures of the drawings. They comprise two lugs 15 in face to face relationship, which define between them a flared central channel 17 (see for example FIG. 6). The lugs 15 are connected together through a base portion 15' which has the form of a sector of a frustum of a cone and which defines the base of the channel 17. The latter is arranged to receive one end of the winding. Each of the associated electrical linking elements, indicated in FIG. 1 at 12a and 12b respectively, extends radially inwardly from the narrowest side of the associated lug 15.

Each lug 15 has a slot 16 in the region of the base of the channel 17, formed on the edge of the lug which is directed radially inwardly, and in this example this slot 16 is semi-circular. In addition, and as is best seen in FIG. 2a, each lug 15 has a generally rounded boss 151 on its inner face, this boss being preferably made by press forming. Its purpose will be explained later on.

FIG. 9 shows the end (or "wire end") of a winding wire FB, which has been fitted in the connecting element 14a. In this example the slip ring unit 1 is in an angular position such that the two connecting elements 14a and 14b are aligned vertically. The wire end is bent through 180°, and the downwardly directed free terminal wire portion of the wire end is engaged in the channel defined between the lugs 15, while its intermediate portion comprising the 180° bend, is lodged in one of the slots 16. Using a suitable tool, the two lugs are subsequently pressed towards each other, so that they then grip the free wire portion of the wire end. This step is followed by soldering, which is carried out for example electrically. It will be observed that, in the context of an automated operation to make this connection, the presence of the bosses 151 enables the degree of gripping of the wire to be easily detected, so that it is adequate to enable the subsequent operation of electric welding to be carried out satisfactorily. More precisely, the bosses 151 enable any cutting of the wire by the sharp edges of the lugs 15 to be avoided during the gripping operation.

The construction of the connecting element, such as the element 14a, has a number of advantages. First of all, the flared shape of the channel 17 which is delimited by the lugs 15 and the base position 15' exerts a guiding force during the introduction of the free end of the wire. This flared shape also enables any undue squeezing effect, during the bending of the lugs 15 so as to effect the gripping action, to be avoided due to the fact that the channel 17 has its greatest width at the level of the junction between the connecting element 14a or 14b with the remainder of the metallic component.

Subsequently, before gripping by the lugs 15 takes effect, the slot 16 which receives the bent portion of the wire ensures that the wire is stabilised in the position shown in FIG. 9, so as in particular to prevent the latter from separating from the channel through the open side of the latter.

Finally, the lugs 15 ensure firm gripping, but not cutting or nicking, of the wire, so ensuring good mechanical retention before the soldering step.

It should be noted here that a wire gripping element such as that described above also finds application in fields other than that between a slip ring unit and a winding of an alternator.

Each of the linking elements 12a and 12b has a portion in the form of part of a cylinder, indicated at 121a and 121b respectively in FIG. 1. This cylindrical portion is welded on to the internal face of the copper cylinder 10 which is adapted to constitute the slip rings. In addition, each linking element 12a, 12b has a generally straight first intermediate portion 122a, 122b respectively, and a second intermediate portion of flat cross section, indicated at 123a and 123b respectively. The cross section of each first intermediate portion 122a, 122b is U-shaped, at least over a substantial portion of its length, as can be seen in particular in the right hand part of FIG. 3 and in FIG. 7, this portion being offset radially inwardly with respect to the respective cylindrical portion 121a or 121b. The flat second intermediate portion 123a, 123b is bent over an angle of about 90°, and that one of its ends which is oriented radially is extended into the respective connecting element 14a or 14b. The variations in profile of the portions 121a, 123a, and 121b, 123b, occur progressively.

It will be noticed here that the cylindrical portions 121a and 121b are welded to the copper cylinder 10 respectively in the region of the latter which is close to the linking elements 12a and 12b, and in its region remote from these latter, in such a way that after the copper cylinder 10 has been divided as mentioned above, the connecting element 14a is only connected to the slip ring 10a, while the connecting element 14b is only connected to the slip ring 10b.

It will also be noted that the U-shaped cross section of the straight intermediate portions enables the rigidity of these latter to be increased, in order to minimise any danger of accidental departure from their correct positions during the moulding stage, and in particular in order to avoid any risk of a short circuit between the portion of the cylinder 10 which is to become the inner slip ring 10a and the adjacent first intermediate portion 122b.

It will be observed in addition that each second intermediate portion 123a, 123b includes, in the vicinity of the respective connecting element 14a or 14b, a wider region indicated at 124a and 124b respectively (see FIG. 4). These wider regions define two lateral anchor lugs 1241. A circular through hole 1242 is formed in these anchor lugs. This hole is arranged to cooperate with fixed or movable means in the mould, in such a way as to give precise positioning of the connecting elements 14a and 14b during the moulding step.

The body of plastics material formed in the step of moulding them onto the above mentioned conductive parts of the slip ring unit will now be described. First of all there is a generally cylindrical body portion 20 which extends within the copper cylinder 10, completely covering its inner face and also the cylindrical portions (conductive pads) 121a, 121b and the parts of the first intermediate portions 122a and 122b that lie within the cylindrical body portion 20. The latter is extended towards the connecting elements 14a and 14b by another cylindrical body portion 22, the outer surface of which is flush with the outer surface of the copper cylinder 10.

The two cylindrical body portions 20 and 22 together define a central cylindrical bore 24, which has two grooves of generally rectangular cross section, 26, 26' extending along its entire length. These grooves are diametrically opposed to each other, and occupy the same angular positions with respect to the axis of the slip ring unit as the connecting elements 14a and 14b. This grooved bore is designed to receive a shaft of the alternator, having a complementary shape, so that the slip ring unit 1, which is force-fitted on the alternator shaft, is splined to the latter.

On the side opposed to the cylindrical body portion 22, the cylindrical body portion 20 is extended by a small collar 28 which has chamfered outer and inner edges indicated at 28a and 28b respectively. Three notches 30, 30' and 30" are formed in the collar 28 as shown in FIG. 2. The depth of these notches is equal to the length of the collar 28 in the axial direction, that is to say the base of each notch leaves the edge of the copper cylinder 10 exposed.

The notch 30 is aligned on the lower spline groove 26, while the other two notches 30' and 30" are offset angularly, in this example by 120°, on either side of the notch 30.

It will be understood that the copper cylinder 10 is firmly trapped in the axial direction between the portions 22 and 28 of the plastics body.

The notches 30, 30' and 30" have a double function. Firstly, the force-fitting of the slip ring unit 1 onto the alternator shaft is carried out, typically in an automated process, by exerting a very large axial force on the slip ring unit 1 from the same side as the collar 28. The three notches 30, 30' and 30" are arranged to receive three pressure fingers of the automatic machine, which then exerts the axial force on the component by engaging not on the body of plastics material, but on that edge of the copper cylinder 10 which is directed towards the collar 28. As a result, this force is applied without any danger of damage to the plastics body material of the slip ring unit, the mechanical strength of which is of course substantially smaller than that of the copper.

In addition, the three notches enable the angular position of the slip ring unit 1 on the alternator to be maintained before it is force-fitted onto the latter.

It will be noted here that the two ends of the rotor winding of the alternator correspond respectively to the inner side of the winding ("current entry side") and to an outer side of the winding ("current exit side"). In the prior art, one of these wire ends was connected indiscriminately to one of the slip rings 10a or 10b, while the other wire end was connected to the other slip ring.

It has however been found that the behaviour of the alternator in the presence of electromagnetic perturbations, for example radiated by radio emissions, and more particularly in the frequency modulation wave band, is influenced to a significant extent by the way in which the ends of the excitation winding are connected to the potentials supplied by the regulator circuit of the alternator. In the arrangement shown in the drawings, the arrangement is such that the inner end of the winding (i.e. that which is closer to the alternator shaft, corresponding to the beginning of the winding during its formation) is connected to that terminal of the regulator which delivers a fixed potential corresponding to a predetermined one of the slip rings 10a and 10b; while the terminal of the regulator that delivers the variable potential corresponding to the other slip ring of the collector, will be connected to the outer end of the winding (i.e. the final end of the winding).

The notches 30, 30' and 30" enable these connections to be made in pairs, with the correct angular position of the slip ring unit 1, selected from its two possible positions offset by 180°, being determined for example by one or more feelers associated with the automatic assembly equipment, or again visually during manual operations.

After the moulding operation has been completed, the body of the slip ring unit 1 has two branches of plastics material, indicated at 32a and 32b in FIG. 1. The conductive first and second intermediate portions 122a, 123a and 122b, 123b respectively are completely encapsulated in these two branches. The slip ring unit 1 also includes a ring-shaped portion 34 having an axis coincident with that of the cylindrical portions 10, 20 and 22, being connected to these latter portions through the branches 32a and 32b and lying at the level of the connecting elements 14a and 14b. More precisely, each branch 32a, 32b comprises a straight portion, 321a, 321b respectively, and a portion 322a, 322b respectively, curved through 90° and following the shape of the curved second intermediate portions 123a and 123b of conductive material. The branches 32a and 32b are joined radially, and in positions diametrically opposed to each other, to the ring portion 34 at the level of the connecting elements 14a and 14b.

It will be observed that each branch 32a, 32b is formed with an outward shoulder, indicated at 323a and 323b respectively, in the transition region between its straight portion and its curved portion.

The inner face of each straight portion 321a, 321b constitutes an axial extension of the inner face of a respective one of the splined grooves 26, 26' in the bore 24, while the outer face of each straight portion has a profile in the form of an arc of a circle and constitutes an axial extension of the outer face of the cylindrical body portion 22.

The ring portion 34 has two thickened portions 341 (see FIG. 4), extending outwardly in two positions which are diametrically opposed to each other and offset by 90° with respect to the connecting elements 14a and 14b. Two slightly concave recesses 342 are formed in the respective outer surfaces of the thickened portion 341. The ring portion 34 also has two further thickened portions 343, again extending outwardly and lying at the level of the connecting elements 14a and 14b, in such a way as partially to trap the anchor lugs 1241. Each of these thickened portions 343 again has a recess 344 (FIG. 2), enabling the offset through holes 1242 to be left.

The formation of the ring portion 34 during the moulding step enables the slip ring unit 1 to be stiffened in the region of the connection element 14a and 14b, while at the same time guaranteeing that their distance apart in the radial direction is properly set. In this connection, the presence of the cooling fan of the alternator not far from the connecting elements 14a and 14b, after the slip ring unit 1 has been force-fitted onto the alternator shaft, makes it necessary to position these elements in a very precise way in the radial direction. In addition, the ring portion 34 satisfactorily prevents any contact occurring between the elements 14a, 14b and an adjacent widened portion of the alternator shaft AR (see FIG. 9) around which the ring portion is positioned, especially when any dilatation effects are taking place due to heating or the accumulation of dust in that region of the alternator.

In addition, the plastics material to be moulded onto the metallic parts of the slip ring unit 1 is preferably injected into the mould in the region of the ring portion 34, and in particular in the region of the thickened portions 341 of the latter.

Furthermore, the concave recess surfaces 342, which are disposed laterally and in diametrically opposed relationship, serve to enable the component to be gripped by an automatic assembly machine, for the purpose of force-fitting the slip ring unit on the alternator shaft. Thus the slip ring unit can be picked up in two possible orientations, offset from each other by 180°. It has been explained above how the notches 30, 30' and 30" enable this orientation to be positively chosen to be such that it is suitable for the energisation of the winding in the correct polarity.

It will also be noted that the shoulders 323a and 323b, which project radially outwardly from the cylindrical surface defined by the copper cylinder 10 and its insulating body portion 22, serve, during the assembly of the component on certain types of alternator, as an axial abutment for a ball bearing which is arranged between the shaft of the alternator and its casing, so as to constitute the rear bearing of the alternator.

FIGS. 10 and 11 show a component in the form of a slip ring unit of the kind described above, mounted respectively on two alternators A of different models. The alternator shaft is indicated at AR, and a rolling bearing for this shaft is indicated at R. From FIGS. 10 and 11, the function of the ring portion 34 will be understood, in that it prevents any "floating" of the connecting elements 14a and 14b, and also prevents any likelihood of short circuits occurring with the closely adjacent portions of the alternator.

It will also be noted that a lateral plate P of the rolling bearing R is in abutment against the shoulders 323a and 323b defined by the body of the slip ring unit 1.

The present invention is of course in no way limited to the embodiment described above and shown in the drawings, and the person skilled in this technical field will be able to apply to it any variation or modification in accordance with the spirit of the invention.

What is claimed is:

1. An electrical terminal connection comprising a wire having a wire end and a connecting element secured to the wire end, the connecting element comprising two lugs in facing relationship and defining a channel between them for receiving the wire end, and a connecting portion joining the lugs together and defining a base of the said lugs being arranged to be bent towards each other to grip the wire end between them, wherein at least one lug defines a lateral edge, the lateral edge having a slot formed therein close to the connecting portion, the wire end comprising a first wire portion extending within the channel, a second wire portion extending outside the channel, and a bent wire portion, bent through approximately 180°, joining said first and second wire portions together and received in said slot.

2. A terminal connection according to claim 1, wherein each said lug defines a said slot.

3. A terminal connection according to claim 1, wherein said slot is semicircular.

4. A terminal connection according to claim 1, in combination with a rigid conductor, the connecting element being a terminal end of the rigid conductor, with the slot being directed towards the rigid conductor.

5. A terminal connection according to claim 1, wherein the first wire portion of the wire end comprises a terminal end of the wire, each said lug having a first lateral edge defining a slot and a second lateral edge which is opposed to the first lateral edge and from which said slot is absent, the channel being divergent from said second lateral edge to said first lateral edge.

6. A terminal connection according to claim 1, defining a U-shaped profile in a cross section transverse to the channel.

7. A terminal connection according to claim 1, wherein each said lug comprises a boss on one of its faces which is directed within the channel.

8. A slip ring unit for an alternator, comprising electrically conductive elements and a body moulded in insulating material over the electrically conductive elements, the unit comprising:

a generally cylindrical first body portion having an outer surface;

two slip rings at said outer surface of the first body portion;

a second body portion;

two connecting elements in said second body portion for connection with respective wire ends of a winding of the alternator;

and an intermediate body portion connecting the first and second body portions electrically and mechanically together, the intermediate body portion comprising two branches, and the connecting elements being embedded in the insulating material, with each said branch comprising a conductive portion connecting an associated slip ring and connecting element, wherein the wire ends and connecting elements constitute two terminal connections according to claim 1.

9. An alternator comprising a body and an alternator shaft projecting from said body, with a slip ring unit according to claim 8 fitted on said shaft.

\* \* \* \* \*

UNITED STATES PATENT AND TRADEMARK OFFICE
CERTIFICATE OF CORRECTION

PATENT NO. : 5,486,732
DATED : January 23, 1996
INVENTOR(S) : Patrick Rondier

It is certified that error appears in the above-indentified patent and that said Letters Patent is hereby corrected as shown below:

On the title page, item [22], delete "Sep. 21, 1994" and add
-- Sep. 12, 1994--.

Signed and Sealed this

Twenty-sixth Day of March, 1996

Attest:

BRUCE LEHMAN

*Attesting Officer*     *Commissioner of Patents and Trademarks*